N. A. WRIGHT.
SPRAY NOZZLE.
APPLICATION FILED NOV. 18, 1911.
1,095,134.
Patented Apr. 28, 1914.
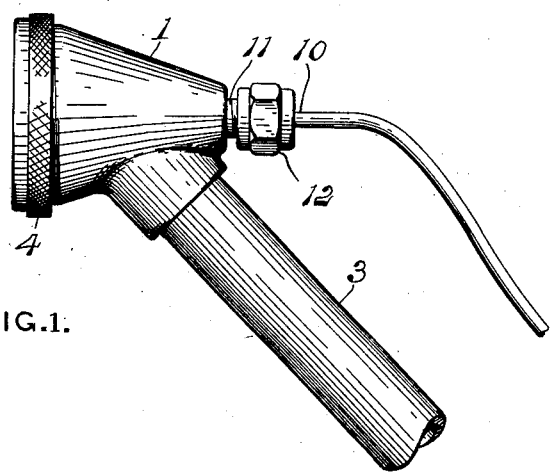
FIG.1.
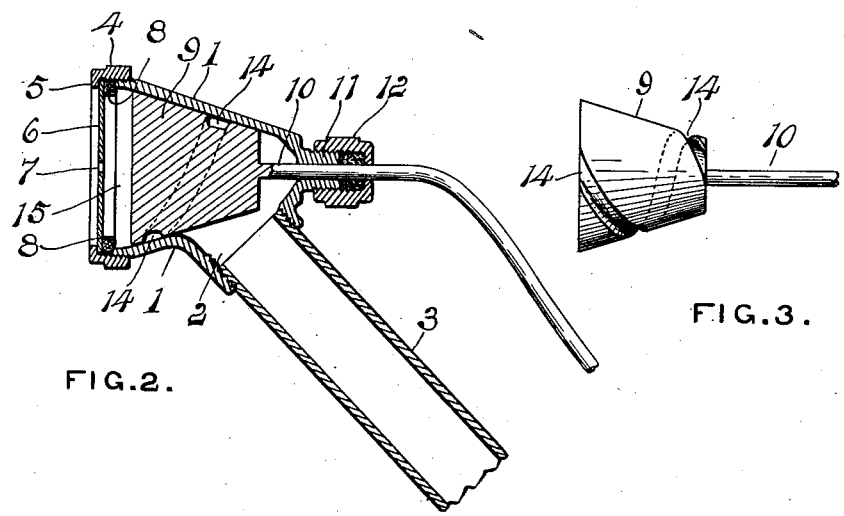
FIG.2.
FIG.3.
Inventor
Norman A. Wright
Witnesses
Chas. W. Stauffiger
Anna E. Rawler
By
Attorneys

UNITED STATES PATENT OFFICE.

NORMAN A. WRIGHT, OF PONTIAC, MICHIGAN.

SPRAY-NOZZLE.

1,095,134.

Specification of Letters Patent.   Patented Apr. 28, 1914.

Application filed November 18, 1911.   Serial No. 660,985.

*To all whom it may concern:*

Be it known that I, NORMAN A. WRIGHT, a citizen of the United States of America, residing at Pontiac, in the county of Oakland and State of Michigan, have invented certain new and useful Improvements in Spray-Nozzles, of which the following is a specification, reference being had therein to the accompanying drawings.

This invention relates to improvements in spray nozzles and its object is to provide a simple device so constructed as to impart to the liquid a very high rotary motion and so arranged that it may be conveniently adjusted to change the density and form of the stream, the invention consisting in the matters hereinafter set forth and more particularly pointed out in the claims, reference being had to the accompanying drawings in which—

Figure 1 is a side elevation of a device embodying the invention; Fig. 2 is a vertical section through the same; and Fig. 3 a side elevation of the conical plug detached.

A conically shaped hollow head or casing 1 is formed with an inlet opening 2 at one side to receive the screwthreaded end of a tube or pipe 3 for conducting fluid to the head. The large or forward end of the head or casing is open and is externally screwthreaded to receive a milled retaining ring 4 having an inwardly extending flange 5 to engage a thin plate or disk 6 having an axial opening 7. A packing ring 8 is interposed between the disk 6 and the end of the casing to make a tight joint and when the ring is turned on, the disk is firmly clamped and held between the flange 5 and the packing ring to close the forward or discharge end of the casing.

Fitting within the casing is a plug 9 in the form of the frustum of a cone and this plug is provided with an axial stem or rod 10 extending from its inner or small end, outward through an opening in a nipple 11 on the rear end of the casing. Said nipple is externally screwthreaded to receive a packing nut 12 and the outer end of the stem may be extended to any desired length and downward to a point convenient to the hand of the operator so that it may be moved longitudinally to shift the plug in the casing.

Cut in the side face of the truncated conical plug is a spiral groove 14 extending from one end to the other of the plug, and when the plug is moved inward into the casing, by means of its stem, so that it is seated within its conical seat in the casing, the outer side of the groove 14 is closed by the casing and the inner end of the groove is open at the inner end of the plug to receive fluid entering the casing from the supply pipe 3, and the outer end of the groove is open at the outer or large end of the plug to discharge the fluid with a rotary motion into the chamber 15 between the outer or large end of the plug and the disk 6. When the plug is so seated, the fluid passes through the spiral groove only and a high rotary motion is thus imparted to it as it enters the chamber 15 and it will be discharged through the small axial opening 7 in the plate 6 with great force, causing it to be broken into a very fine spray and distributed over a wide area. When the plug is moved outward away from its seat in the casing by moving the rod 10, a part of the fluid entering the rear end of the casing will pass into the chamber 15 around the sides of the plug and part will pass through the spiral groove. The fluid passing through the groove will be sufficient to give to the fluid in the chamber 15 a rotary motion but this motion will be much less than when the fluid is forced to pass through the groove only, and the stream issuing from the opening 7 will be of greater density and will be projected a long distance, the spray area being accurately regulated by moving the plug inward or outward. The spiral form of the groove imparts to the fluid a very high rotary motion and the conical form of the plug tends also to increase the motion as the distance of the groove from the axis of the plug increases toward the discharge end of the groove.

The stem 10 is shown as being extended so that it may be conveniently operated, but it is evident that any desired means may be employed to move the plug longitudinally.

Obviously, other changes in the construction and arrangement of parts may be made without departing from the spirit of the invention and I do not wish to limit myself to the particular construction shown.

Having thus fully described my invention what I claim is:—

1. In a spray nozzle, the combination of a casing having an inlet at one end and an axial discharge opening at its opposite end, and a conically shaped plug seated within the casing and formed with a fluid passage opening through the ends of the plug, said plug being seated within the casing with a space between its large end and the discharge end of the casing to form a chamber between said end and the end of the plug into which chamber the discharge end of the passage opens.

2. In a spray nozzle, the combination of a casing having an inlet opening at one end and an axial discharge opening at its opposite end, a plug in said casing having the form of the frustum of a cone and formed with a spiral groove in its periphery, the ends of which groove are open at the ends of the plug, said casing being formed to fit the plug which is adapted to seat therein and said plug being arranged with a space between its large end and the discharge end of the casing which space forms a chamber into which the groove in the plug opens, and means for adjusting the plug toward and from its seat in the casing.

3. In a spray nozzle, the combination of a casing having an inlet opening at one end and open at its discharge end, a plate to close the discharge end of the casing having an axial discharge opening, a conically formed plug in the casing having a spiral groove in its periphery extending from end to end thereof, said casing being formed with a conical interior seat to fit the plug and said plug being arranged with a chamber between its large end and the said closing plate, and a stem for the plug extending outward through the casing for adjusting the plug toward and from its seat.

4. In a spray nozzle the combination of a hollow conically shaped casing having an inlet opening near one end and an externally screwthreaded discharge end, a closing plate for the discharge end of the casing having an axial discharge opening, a ring engaging the screwthreaded end of the casing to secure the plate in place, a plug in the casing having the form of the frustum of a cone and provided with a groove in its periphery extending from end to end thereof, the casing being formed with an interior seat to fit the plug and the plug being arranged at a distance from the closing plate to form a chamber between the large end of the plug and said plate, a stem for the plug extending outward through an opening in the rear end of the casing for moving the plug toward and from its seat in the casing, and a pipe entering the inlet opening in the casing to supply fluid thereto.

In testimony whereof I affix my signature in presence of two witnesses.

NORMAN A. WRIGHT.

Witnesses:
CLARA B. NUSTAUMER,
ARTHUR KNIGHT.